United States Patent
Ichinose et al.

(10) Patent No.: US 9,517,604 B2
(45) Date of Patent: Dec. 13, 2016

(54) VULCANIZED TIRE VULCANIZATION APPARATUS

(71) Applicant: BRIDGESTONE CORPORATION, Chuo-ku, Tokyo (JP)

(72) Inventors: Masayuki Ichinose, Kodaira (JP); Yuusuke Tamura, Kodaira (JP); Akio Obayashi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/593,388

(22) Filed: Jan. 9, 2015

(65) Prior Publication Data

US 2016/0200058 A1    Jul. 14, 2016

Related U.S. Application Data

(62) Division of application No. 13/379,817, filed as application No. PCT/JP2010/060676 on Jun. 23, 2010, now Pat. No. 9,387,638.

(30) Foreign Application Priority Data

Jun. 23, 2009 (JP) ................. 2009-149003

(51) Int. Cl.
    *B29D 30/06* (2006.01)
(52) U.S. Cl.
    CPC ... *B29D 30/0662* (2013.01); *B29D 2030/0667* (2013.01); *B29D 2030/0675* (2013.01)
(58) Field of Classification Search
    CPC .............. B29D 30/0662; B29D 2030/0667
    See application file for complete search history.

(56) References Cited

U.S. PATENT DOCUMENTS

| 4,547,544 A | 10/1985 | Allardice |
| 5,853,526 A * | 12/1998 | Laurent ............... B29C 43/3642 |
| | | 156/396 |
| 6,402,490 B1 | 6/2002 | Menard |
| 6,802,998 B2 * | 10/2004 | Ono ....................... B29C 35/04 |
| | | 264/315 |

(Continued)

FOREIGN PATENT DOCUMENTS

| JP | 49-23284 A | 3/1974 |
| JP | 9-38966 A | 2/1997 |

(Continued)

OTHER PUBLICATIONS

Non-Final Office Action dated Aug. 24, 2015 issued in U.S. Appl. No. 13/379,817.

(Continued)

*Primary Examiner* — James Mackey
(74) *Attorney, Agent, or Firm* — Sughrue Mion, PLLC

(57) ABSTRACT

A vulcanization apparatus provided with a vulcanization vessel for vulcanizing a green tire and a suction line for sucking out gas from inside the vulcanization vessel after the vulcanization vessel has been opened. Accordingly, oily smoke generated when vulcanized rubber has been removed from a bladder and an inner wall of a mold can be more efficiently discharged than in cases in which gas inside a vulcanization vessel is sucked out and additional air is introduced into the vulcanization vessel only prior to opening the vulcanization vessel.

4 Claims, 8 Drawing Sheets

(56) References Cited

U.S. PATENT DOCUMENTS

| | | |
|---|---|---|
| 2001/0054782 A1 | 12/2001 | Ono |
| 2004/0046286 A1 | 3/2004 | Seko et al. |
| 2012/0161365 A1* | 6/2012 | Ichinose ............ B29D 30/0662 264/319 |

FOREIGN PATENT DOCUMENTS

| | | |
|---|---|---|
| JP | 11-58388 A | 3/1999 |
| JP | 2000-153527 A | 6/2000 |
| JP | 2003-62832 A | 3/2003 |
| WO | WO 2010/150826 | * 12/2010 |

OTHER PUBLICATIONS

International Search Report of PCT/JP2010/060676 datd Sep. 21, 2010.
Non-Final Office Action dated Dec. 15, 2014 issued in U.S. Appl. No. 13/379,817.
Communication dated Apr. 7, 2015, issued by the U.S. Patent and Trademark Office in corresponding U.S. Appl. No. 13/379,817.

* cited by examiner

VULCANIZED TIRE VULCANIZATION APPARATUS

CROSS REFERENCE TO RELATED APPLICATIONS

This application is a divisional of U.S. application Ser. No. 13/379,817, filed Mar. 19, 2012, which is a National Stage of International Application No. PCT/JP2010/060676 filed Jun. 23, 2010, claiming priority based on Japanese Patent Application No. 2009-149003, filed Jun. 23, 2009, the contents of all of which are incorporated herein by reference in their entirety.

TECHNICAL FIELD

The present invention relates to a vulcanized tire manufacturing method and a vulcanization apparatus which suppress oily smoke from spreading out within a building.

BACKGROUND ART

Often a vulcanization apparatus is employed for vulcanizing when a rubber product such as a tire is manufactured. However when a vulcanization vessel (chamber) of a vulcanization apparatus is opened after vulcanization, oily smoke from the chamber disperses into the surroundings. A high rate of ventilation turnover is therefore required in a building installed with a vulcanization apparatus due to the relationship to the operational environment.

A counter measure to prevent oily smoke from a chamber spreading is described in Japanese Patent Application Laid-Open (JP-A) No. 49-23284; oily smoke is forcibly discharged by exhausting from the chamber while also feeding air into the chamber during vulcanization.

Furthermore, there is a description in JP-A No. 9-38966 of sucking white smoke gas (a gas including oily smoke) from inside a chamber while introducing additional air when vulcanization has been completed and prior to opening the chamber of a vulcanization apparatus.

DISCLOSURE OF INVENTION

Technical Problem

However, in the related art described above, a process is performed within a chamber in which air is fed to a tire interior and air is discharged from the tire interior in a state in which the majority of the surface of the object for vulcanization is in contact with a mold and a bladder. There is accordingly little effect to suppress of oily smoke generated after the chamber has been opened from spreading out into the surroundings, and in particular when the object for vulcanization is removed from the mold and the bladder.

In consideration of the above circumferences the present invention is directed towards a manufacturing method of a vulcanized tire in which oily smoke is suppressed from spreading out into the surroundings after a vulcanization vessel has been opened, and to a vulcanization vessel of the same.

Solution to Problem

In a first aspect of the present invention a green tire is vulcanized in a vulcanization vessel for tire vulcanization, and gas is sucked out from inside the vulcanization vessel at least after the vulcanization vessel has been opened.

Gas is not limited to air and another gas such as nitrogen may be employed. Sucking in gas means that oily smoke suspended in the gas is also sucked in.

In the present specification opening a vulcanization vessel in which an object for vulcanization has been vulcanized means that a mold disposed in a contact state with respect to the object for vulcanization during vulcanization is moved from this state to a state separated from the object for vulcanization. The phrase at least after the vulcanization vessel has been opened means that action may also occur prior to the vulcanization vessel being opened. In the present specification sucking out gas in the vulcanization vessel when the vulcanization vessel is in an opened state means sucking gas that remains inside the vulcanization vessel and sucking in gas flowing out from the locations where the vulcanization vessel is open.

There are no particular limitations to the mode adopted for opening the vulcanization vessel, an up-down direction opening mode may be employed, a left-right opening mode may be employed, and also a vulcanization vessel configured to be openable and closeable by an upper member of the vulcanization vessel being joined to the lower member of the vulcanization vessel with pins may also be employed.

Accordingly, in the first aspect of the present invention, gas is sucked out from inside the vulcanization vessel at least after the vulcanization vessel has been opened.

Accordingly, compared to cases in which gas is discharged from inside a vulcanization vessel while gas is also being fed into the vulcanization vessel during vulcanization, there is no need to supply gas at high pressure, and an energy saving advantageous effect is obtained since heat during vulcanization does not need to be discharged. However, oily smoke generated when a vulcanized tire has been removed from a bladder and the inside wall of a mold can be efficiently discharged from inside the vulcanization vessel such that oily smoke is suppressed from spreading out into the surroundings of the vulcanization vessel. Note that oily smoke is mainly composed of oil and normally has the appearance of a white smoke.

The manufacturing time can also be shortened in comparison to cases in which gas in the vulcanization vessel is sucked out and further air introduced into the vulcanization vessel only prior to opening the vulcanization vessel. However, the oily smoke generated when the vulcanized tire has been removed from the bladder and the inner wall of the mold can still be efficiently discharged, and the oily smoke can be suppressed from spreading out into the surroundings of the vulcanization vessel.

A second aspect of the present invention is the first aspect wherein sucking is performed from the central axis side of the vulcanized tire when sucking out gas that is inside the vulcanization vessel.

In the second aspect of the present invention, gas at the periphery of the tire can accordingly be sucked out more smoothly and evenly than in cases where gas is sucked out from the tread face side of a vulcanized tire. Note that positioning the center of suction on the central axis is most preferable from the perspective of sucking gas evenly.

A third aspect of the present invention is the first aspect of the present invention or the second aspect of the present invention wherein the vulcanized tire is pulled upwards off a bladder inside the vulcanization vessel when the vulcanization vessel is being opened.

By configuring in this manner the tire can be removed from the bladder using the action to open the vulcanization vessel. Normally a releasing agent is applied to at least one of the bladder surface and/or the tire inner surface, and a large amount of oily smoke including the releasing agent is generated when the tire is removed from the bladder after vulcanization has been completed. The oily smoke generated when the tire has been removed from the bladder can accordingly be efficiently discharged.

A fourth aspect of the present invention is a vulcanization apparatus equipped with: a vulcanization vessel for vulcanizing non-vulcanized rubber; and a suction device for sucking out gas that is inside the vulcanization vessel at least after the vulcanization vessel has been opened.

Similarly to in the first aspect, the phrase at least after the vulcanization vessel has been opened means that action may also occur prior to the vulcanization vessel being opened. There are no particular limitations to the mode adopted for opening the vulcanization vessel, an up-down direction opening mode may be employed, a left-right opening mode may be employed, and also a vulcanization vessel configured to be openable and closeable by an upper member of the vulcanization vessel being joined to the lower member of the vulcanization vessel with pins may also be employed.

In the fourth aspect, gas that is inside the vulcanization vessel is sucked out with the suction device at least after the vulcanization vessel has been opened.

Accordingly, compared to cases in which gas is discharged from inside a vulcanization vessel while gas is also being fed into the vulcanization vessel during vulcanization, there is no need to supply gas at high pressure enabling the vulcanization vessel to be simplified, and an energy saving advantageous effect is obtained since heat during vulcanization does not need to be discharged. However, oily smoke generated when a vulcanized tire has been removed from a bladder and the inside wall of a mold can still be efficiently discharged.

The manufacturing time can also be shortened in comparison to cases in which gas in the vulcanization vessel is sucked out and further air introduced into the vulcanization vessel only prior to opening the vulcanization vessel. However, an advantageous effect is exhibited of enabling the oily smoke generated when the vulcanized rubber has been removed from the bladder and the inner wall of the mold to be efficiently discharged.

A fifth aspect of the present invention is the fourth aspect of the present invention wherein the vulcanization vessel comprises a controller for controlling the suction device so as to start sucking out gas after the vulcanization vessel has been opened.

Operation to initiate gas sucking out with the suction device may accordingly be performed without operator intervention.

A sixth aspect of the present invention is the fourth aspect of the present invention or the fifth aspect of the present invention wherein: the vulcanization vessel includes a hood section provided at least at an upper portion of the vulcanization vessel and covering from the outside at least a portion of the vulcanization vessel; and the suction device sucks out gas that is inside the hood section.

Accordingly, even if oily smoke is generated at least after the vulcanization vessel has been opened inside the hood section or below the hood section, it is possible to suction up almost all of the air containing the oily smoke, enabling the oily smoke to be further suppressed from being dispersed into the surroundings.

A seventh aspect of the present invention is any one of the fourth to the sixth aspects of the present invention, wherein: the vulcanization vessel includes a mounting section; and an air-curtain forming section is provided to the mounting section to partition the inside of the vulcanization vessel from the external space using an air-curtain when the vulcanization vessel has been opened.

In the seventh aspect of the present invention, oily smoke can be further suppressed with the air curtain from spreading out into the surroundings even when the vulcanization vessel is open.

Advantageous Effects of Invention

The present invention provides a vulcanized tire manufacturing method and vulcanization apparatus capable of suppressing oily smoke from spreading out into the surroundings when a vulcanization vessel has been opened.

DESCRIPTION OF EMBODIMENTS

Figure 1A:
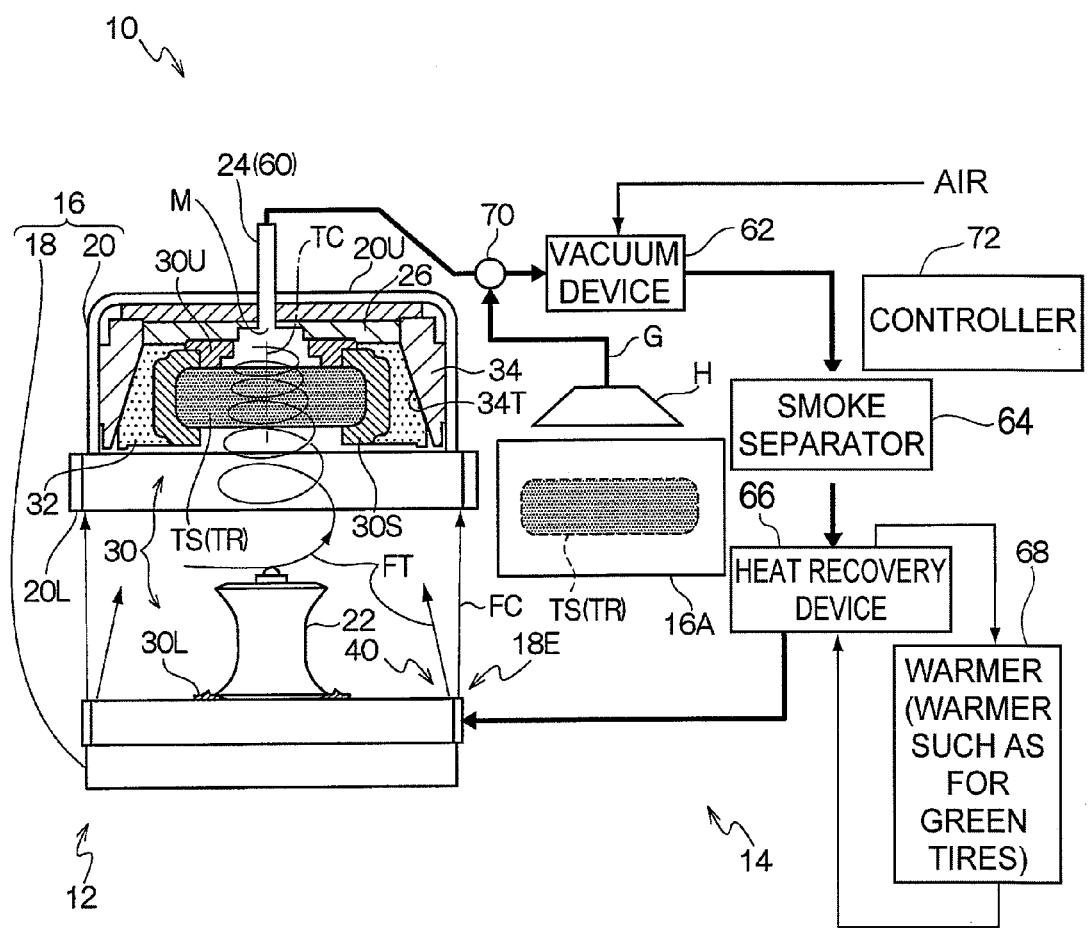
FIG. 1A is an explanatory diagram for explaining a configuration of a vulcanization apparatus according to an exemplary embodiment of the present invention.

Explanation follows regarding an exemplary embodiment of the present invention giving examples of embodiments thereof. As shown in FIG. 1 to FIG. 3A, a vulcanization apparatus 10 according to an exemplary embodiment of the present invention includes a vulcanization molding machine 12 for vulcanizing a green tire and a suction line 14 for sucking out gas that is inside a vulcanization vessel.

Vulcanization Molding Machine

The vulcanization molding machine 12 includes a mounting section 18 and a thermal insulating hood section 20 that together configure a vulcanization vessel 16. A structure is configured such that a sealed state of the vulcanization vessel 16 is achieved by a mold and an object to be vulcanized (green tire) making contact with each other. A bladder 22 extends up from the center of the mounting section 18. The hood section 20 is positioned above the mounting section 18 and provided with capability to move up or down. The state of the vulcanization vessel 16 is switched between open and closed by moving a platen plate 26 and an expansion and contraction guide section 34, described later, up or down. The hood section 20 is supported by a raising and lowering mechanism, not shown in the drawings, so as to be capable of moving up or down.

Figure 5:
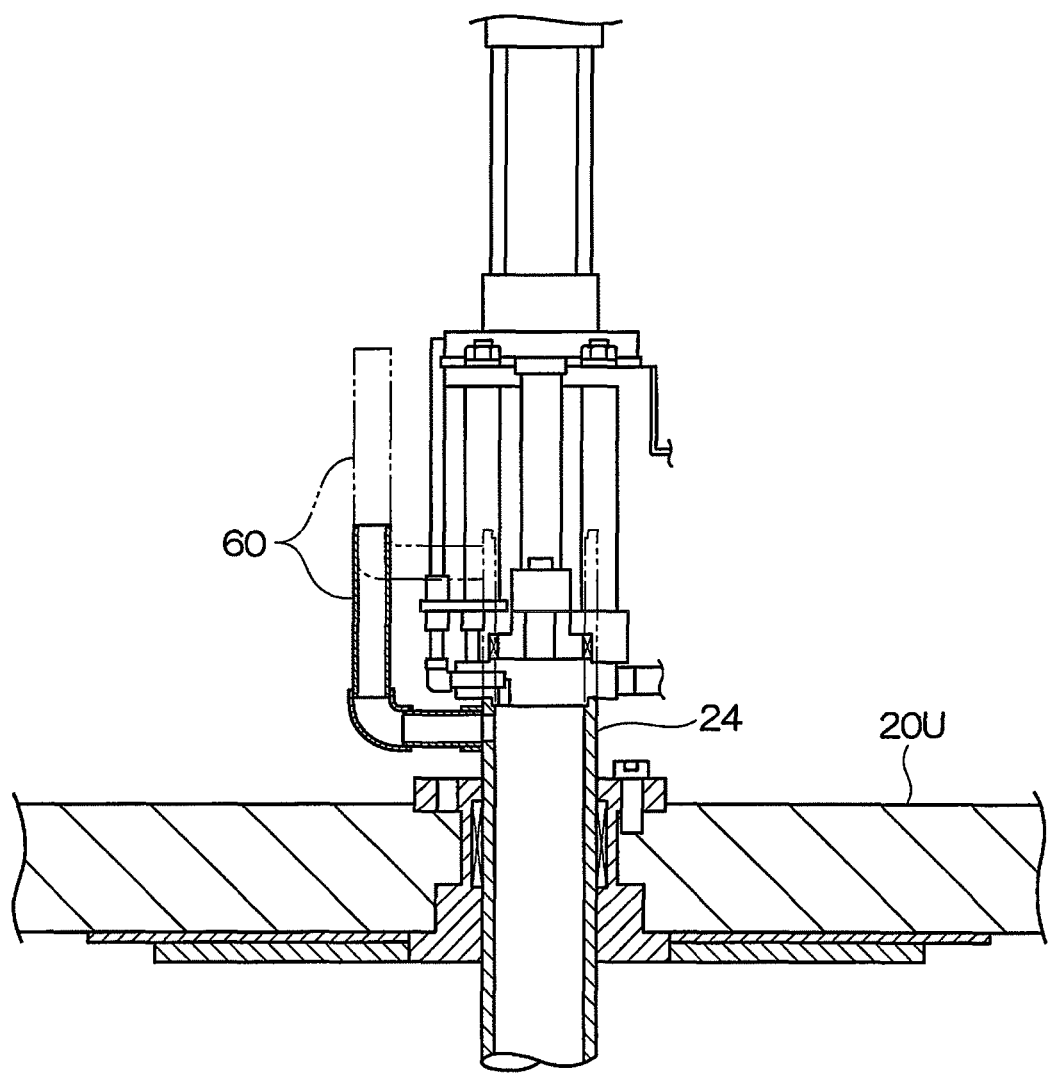
FIG. 5 is a cross-section for explaining a cylinder section, and a branch pipe branched off from the cylinder section in a vulcanization apparatus according to an exemplary embodiment of the present invention.

In the vulcanization molding machine 12 an up-down movable cylinder section 24 (see FIG. 5) is provided passing through the hood section 20 along the up-down direction. The cylinder section 24 passes through a ceiling section 20U of the hood section 20 so as to be positioned on the central axis of the hood section 20. A circular plate shaped platen plate 26 is attached to a bottom end portion of the cylinder section 24 and the cylinder section 24 opens onto the bottom face side of the platen plate 26.

The vulcanization molding machine 12 includes a so-called push-pull type of mold 30 for containing a raw tire (green tire (GT)) on the inside of the hood section 20. The mold 30 is configured by an upper mold 30U and a lower mold 30L for vulcanizing a tire from the respective side wall sections to the respective bead sections, and a side mold 30S that makes contact with the upper mold 30U and the lower mold 30L during vulcanization and vulcanizes the tread section of the tire, and from the shoulder section across to the sidewall section of the tire. The lower mold 30L is fixed to the mounting section 18.

Figure 2:
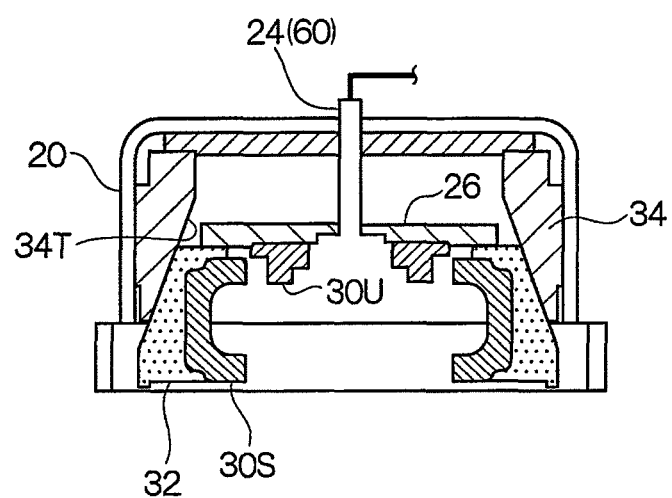
FIG. 2 is side view cross-section of a vulcanization apparatus according to an exemplary embodiment of the present invention for explaining a state in which a cylinder section has been lowered and a mold has been opened.

The upper mold 30U is supported by the bottom face side of the platen plate 26. The side mold 30S is attached to a segment holder 32 at the tire radial direction outside of the side mold 30S. The segment holder 32 and the side mold 30S are configured so as to be divided into plural segmented members. The expansion and contraction guide section 34 is provided at the tire radial direction outside of the segment holder 32 and is formed with a taper face 34T that widens out on progression downwards. The segment holder 32 is pressed by the platen plate 26 when the cylinder section 24 is lowered with respect to the expansion and contraction guide section 34, as shown in FIG. 2. The segment holder 32 is accordingly lowered while being guided by the taper face 34T of the expansion and contraction guide section 34 with its diameter gradually expanding, opening the side mold 30S. In reverse, when the cylinder section 24 is raised with respect to the expansion and contraction guide section 34, the segment holder 32 is guided by the taper face 34T, and is raised while its diameter gradually contracts, closing the side mold 30S. This configuration enables the tire to be housed in or extracted from the inside of the mold 30.

The platen plate 26, the upper mold 30U, the segment holder 32, the lower mold 30L and the expansion and contraction guide section 34 are all disposed at the inside of the hood section 20. The upper mold 30U and the side mold 30S are thus covered by the hood section 20 irrespective of whether the side mold 30S is open or closed. It is preferable for the hood section 20 to be shaped in this manner so as to cover the whole of the top face side of the vulcanization vessel 16 from the perspective of sucking out gas that is inside the vulcanization vessel 16. However configuration may be made with the hood section 20 shaped so as to cover only a portion of the top face side of the vulcanization vessel 16.

Figure 3A:
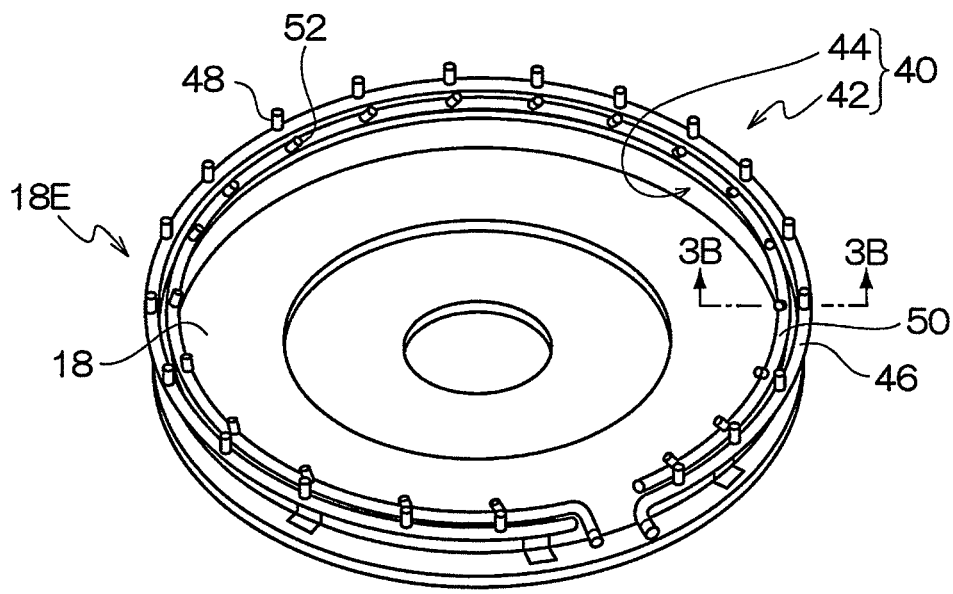
FIG. 3A is a perspective view of an air-curtain forming section of a vulcanization apparatus according to an exemplary embodiment of the present invention.

As shown in FIG. 1A and FIG. 3A, the mounting section 18 of the vulcanization molding machine 12 is equipped with an air-curtain forming section 40 disposed at a top face peripheral edge portion 18E of the mounting section 18. The air-curtain forming section 40 is fed with gas discharged from a heat recovery device 66, described later. A configuration is accordingly achieved in which there is an air-curtain FC (see FIG. 1A) formed from the top face peripheral edge portion 18E of the vulcanization molding machine 12 to a bottom edge portion 20L of the hood section 20.

Figure 3B:
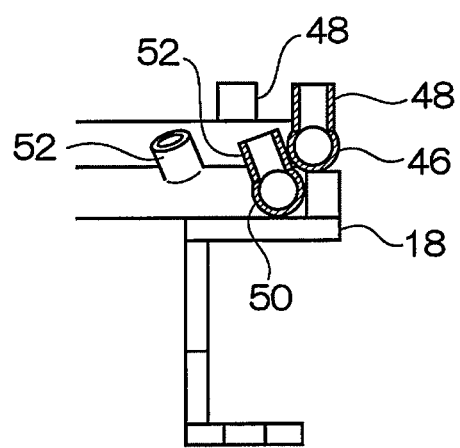
FIG. 3B is a partial side view cross-section of an air-curtain forming section of a vulcanization apparatus according to an exemplary embodiment of the present invention, taken on arrowed line 3B-3B of FIG. 3A.

As shown in FIG. 3A and FIG. 3B, the air-curtain forming section 40 is configured by an outside jetting section 42 and an inside jetting section 44. The outside jetting section 42 includes a circular shaped pipe 46 and short pipe shaped outside extension portions 48 disposed at even intervals around the pipe 46 and extending upwards. A jetting nozzle is formed at the leading end of each of the outside extension portions 48 such that an air-curtain is formed by gas jetted from these jetting nozzles.

The inside jetting section 44 includes a circular shaped pipe 50 disposed below the pipe 46 and short pipe shaped inside extension portions 52 disposed at even intervals around the pipe 50. The inside extension portions 52 are all slightly inclined so as face along the same circumferential direction of the pipe 50 and are also slightly inclined towards the pipe inside. A jetting nozzle is formed at the leading end of each of the inside extension portions 52. A gas flow F (see FIG. 1A) of tornado shape (spiral vortex shape) is thereby generated by gas that has been jetted from the nozzles so as to head towards the center of the ceiling section 20U of the hood section 20.

Suction Line

Figure 6:
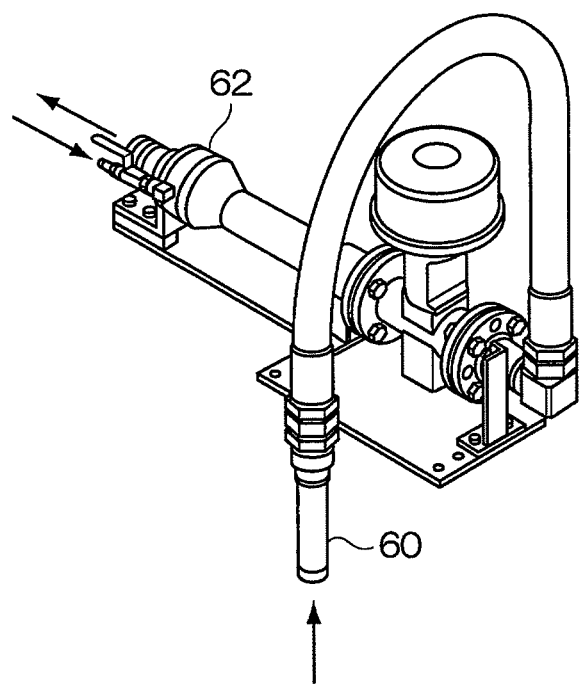
FIG. 6 is a perspective view illustrating a vacuum device of a vulcanization apparatus according to an exemplary embodiment of the present invention.

The suction line 14 is provided with the cylinder section 24 forming a suction inlet M inside the hood section 20 and a branch pipe 60 (see FIG. 5) branched off from the cylinder section 24. An ejector type vacuum device (gas suction device) 62 (see FIG. 6) for sucking gas in, a smoke separator 64 for removing oily smoke from the gas that has been sucked in, and the heat recovery device 66 for recovering heat from the gas passing through the smoke separator 64 are each provided to the suction line 14, in this sequence from the upstream side to the downstream side. In the present exemplary embodiment, the smoke separator 64 is configured by a dust collector (air cleaning device). The smoke separator 64 may be configured by any known smoke separator, and may be configured to remove smoke by passing gas downstream while using a water shower. In the present exemplary embodiment, the heat recovered from the heat recovery device 66 is employed in a warming device 68 for warming a green tire in order to shorten the vulcanization duration.

Figure 1B:
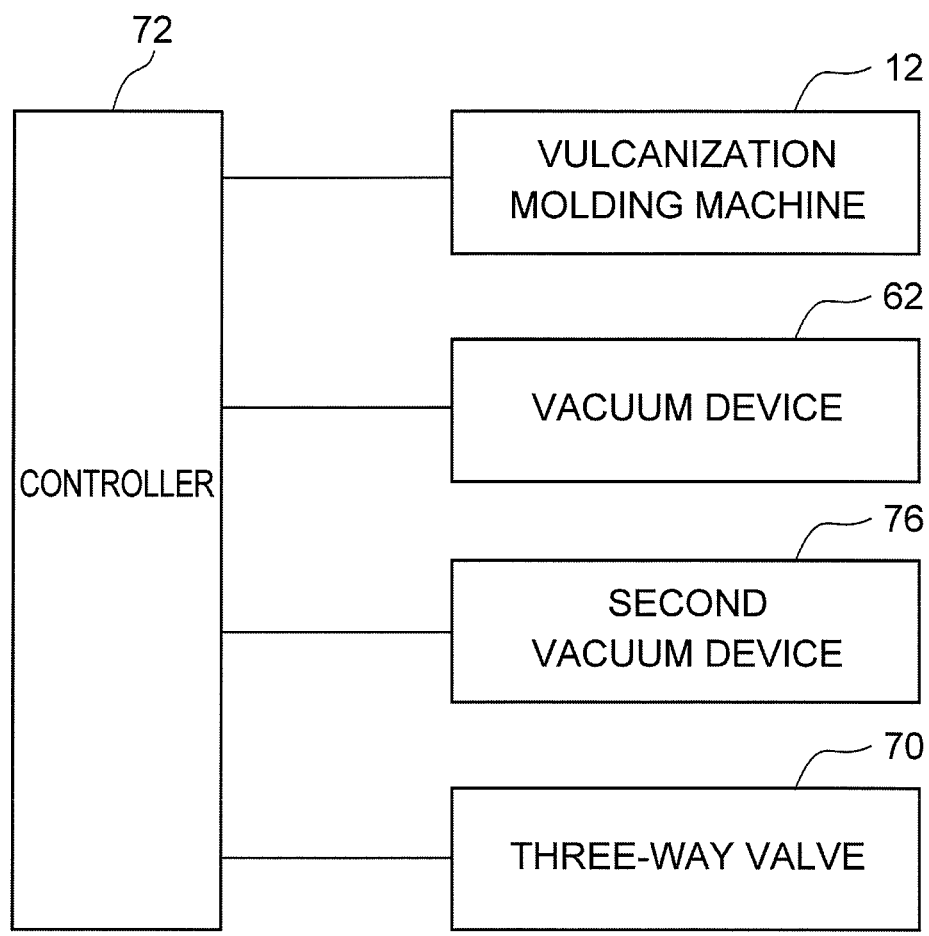
FIG. 1B is a schematic block diagram illustrating a configuration of a control system of a vulcanization apparatus according to an exemplary embodiment of the present invention.

As shown in FIG. 1A the vulcanization apparatus 10 is also provided with one or plural other vulcanization molding machine(s) (for example the vulcanization molding machine 16A). A hood section H is provided to correspond to the vulcanization vessel 16 of each of the vulcanization molding machines 16A. Each of the hood sections H has a gas suction branch line G for connecting to the suction line 14 described above by connecting through a three-way valve 70 provided between the branch pipe 60 and the vacuum device 62. A controller 72 is provided in the vulcanization apparatus 10 for temperature control of the vulcanization molding machine 12, for operation control of the vacuum device 62 and a second vacuum device 76, described later, for open-shut control of each of the vulcanization molding machines 12 and for switching control of the three-way valve 70 that accompanies this opening and shutting. The controller 72 is, as shown in FIG. 1B, connected to the vulcanization molding machine 12, the vacuum device 62, the second vacuum device 76 and the three-way valve 70.

Figure 4:
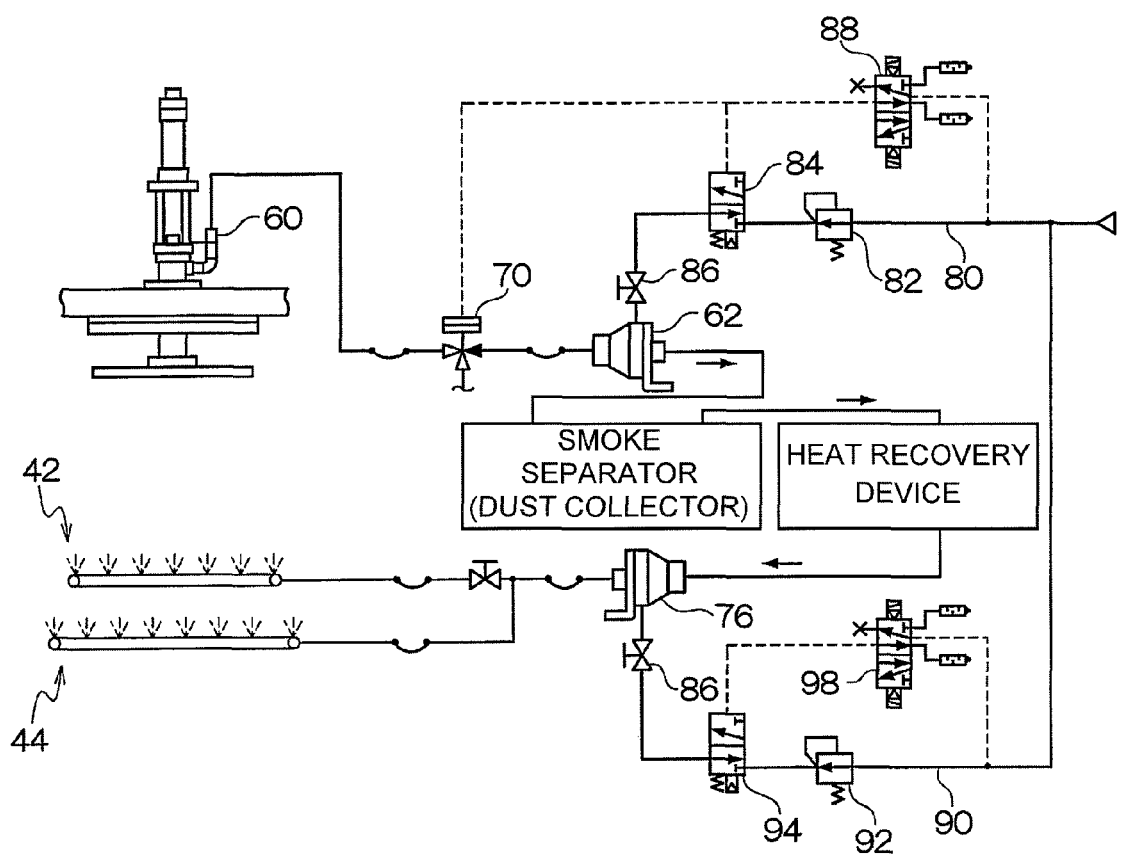
FIG. 4 is a schematic diagram illustrating a suction system of a suction line and a gas supply system to an air-curtain forming section, provided to a vulcanization apparatus according to an exemplary embodiment of the present invention.
Figure 7:
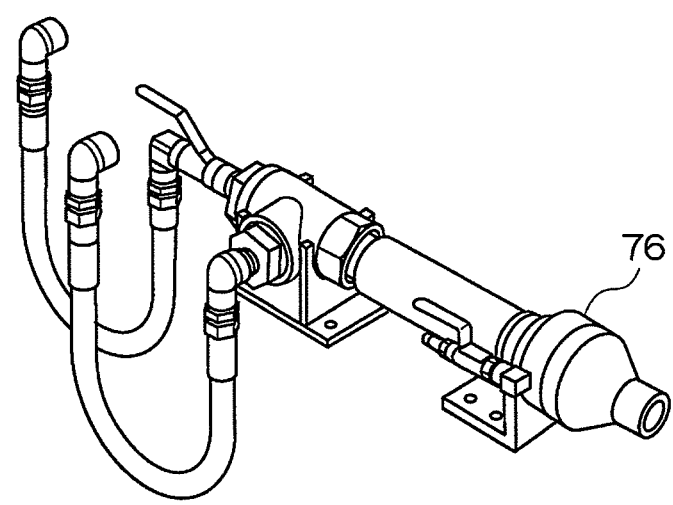
FIG. 7 is a perspective view illustrating a second vacuum device of a vulcanization apparatus according to an exemplary embodiment of the present invention.

FIG. 4 is an explanatory diagram illustrating details of a suction system of the suction line 14 and a gas supply system to the air-curtain forming section. The second vacuum device 76 (see also FIG. 7) may also be further disposed in the suction line 14 between the heat recovery device 66 and the mounting section 18. In the following explanation an example is explained in which the second vacuum device 76 is provided.

As shown in FIG. 4, the suction line 14 is connected to a first feed line 80 for supplying compressed gas to the vacuum device 62 and to a second feed line 90 for supplying compressed gas to the second vacuum device 76. A pressure reducing valve 82, an air operation valve (mechanical valve) 84 and an open-shut valve 86 are disposed along the first feed line 80 in sequence from the upstream side to the downstream side. An electromagnetic valve 88 is provided for performing open and shut control of the three-way valve 70 and the air operation valve 84. A pressure reducing valve 92, an air operation valve (mechanical valve) 94 and an open-shut valve 96 are also disposed along the second feed line 92 in sequence from the upstream side to the downstream side. An electromagnetic valve 98 is provided for performing open and shut control of the air operation valve 94.

Note that in place of the cylinder section 24 configuration may be provided with a serpentine shaped duct section opening onto the inside of the hood and a suction pipe connected to the downstream end of the duct section, with the vacuum device 62, the smoke separator 64 and the heat recovery device 66 provided to the suction pipe. Adopting such an approach enables the apparatus configuration to be simplified.

Vulcanized Tire Manufacturing Method and Operation and Effects

Explanation follows regarding manufacturing a vulcanized tire employing the vulcanization apparatus 10, and regarding operation and effects of the present exemplary embodiment.

First, a green tire TR is held in the vulcanization vessel 16 of the vulcanization molding machine 12 and the vulcanization vessel 16 closed. A green tire that has been warmed with the warming device 68 may be employed as the green tire TR.

Under instruction from the controller 72 the temperature inside the vulcanization vessel 16 is then raised to a set temperature and the green tire TR is vulcanize-molded by letting a specific duration elapse.

After the specific duration has elapsed, the temperature inside the vulcanization vessel 16 is lowered under instruction from the controller 72. The upper mold 30U, the side mold 30S and the hood section 20 are raised under instruction from the controller 72, and the vulcanization vessel 16 is opened. As this occurs, chamber opening is initiated by raising the expansion and contraction guide section 34 holding the side mold 30S. When the hood section 20 is raised and it has become possible for air to flow into the vulcanization vessel 16, gas suction is started with the vacuum device 62 and the second vacuum device 76 under instruction from the controller 72, and gas is sucked out from the suction inlet M. As a result gas is sucked out from the central axis TC of the vulcanized tire TS that has been formed by vulcanizing the green tire TR. The gas is fed to the smoke separator 64, oily smoke is removed, and then the gas is fed to the heat recovery device 66. Configuration may be made such that gas from inside the vulcanization vessel 16 is sucked out starting from prior to opening the vulcanization vessel 16.

The gas exhausted from the second vacuum device 76 is injected into the air-curtain forming section 40 after the oily smoke has been removed. Due to injecting the gas a tornado shaped gas flow FT (with, for example, air speed in the range of 3 to 6 m/s) for example is formed by the gas jetted from the inside jetting section 44 from the top face peripheral edge portion 18E of the mounting section 18 towards the suction inlet M. The oily smoke inside the vulcanization vessel 16 is accordingly smoothly sucked out from the suction inlet M. The gas flow FT at the inside of the chamber flowing towards the suction inlet M accordingly acts to suppress oily smoke from lingering. A partitioning air-curtain FC is formed from the top face peripheral edge portion 18E to the bottom edge portion 20L of the hood section 20 by the gas jetted from the nozzles of the outside jetting section 42. Oily smoke in the vulcanization vessel 16 is accordingly prevented from spreading out within a building. Note that in the present exemplary embodiment explanation has been given of a case in which both the gas flow FT and the air-curtain FC are formed. However an embodiment may be configured where only one of the gas flow FT or the air-curtain FC is formed. Furthermore it is possible to form an air-curtain without employing the gas recovered as described above, such as by providing a separate air moving device.

In order to open the vulcanization vessel 16 the hood section 20, the upper mold 30U, and the side mold 30S are raised, and the vulcanized tire TS being held by the upper mold 30U and the side mold 30S is pulled upwards off the bladder 22. The vulcanized tire TS is accordingly removed from the bladder 22 by the action to open the vulcanization vessel 16. Normally a releasing agent is applied to at least one of the bladder surface and/or the tire inner surface, and a large amount of oily smoke including components of the releasing agent is generated when the vulcanized tire TS is removed from the bladder 22 after vulcanization has been completed. The oily smoke generated when the vulcanized tire TS has been removed from the bladder 22 is accordingly efficiently sucked in from the suction inlet M and discharged.

As explained above, in the present exemplary embodiment the green tire TR is vulcanized inside the vulcanization vessel 16, the gas in the hood section 20, and also the gas in the space partitioned by the air-curtain FC, is sucked in using the suction line 14 as the vulcanization vessel 16 gradually opens. Consequently, compared to cases in which gas is discharged from inside a vulcanization vessel while gas is also being fed into the vulcanization vessel during vulcanization, there is no need to supply high pressure gas, and an energy saving advantageous effect is obtained since heat during vulcanization does not need to be discharged. However, the oily smoke generated when the vulcanized tire TS has been removed from the bladder 22 and the inside wall of the mold can be efficiently discharged such that oily smoke is suppressed from spreading out into the surroundings. The operating environment inside the building can accordingly be greatly improved, while the temperature in the building can also be suppressed from rising.

The manufacturing time can also be shortened in comparison to cases in which gas in the vulcanization vessel 16 is sucked out and further air introduced into the vulcanization vessel only prior to opening the vulcanization vessel 16. However, the oily smoke generated when the vulcanized tire TS has been removed from the bladder 22 and the inner wall of the mold can still be efficiently discharged, and the oily smoke can be suppressed from spreading out into the surroundings.

Furthermore, gas is sucked out from the radial direction central portion TC of the tire when gas is sucked in with the suction line 14. Gas suction can accordingly be efficiently performed evenly around the periphery of the vulcanized tire TS.

The vulcanized tire TS is also pulled off the bladder 22 upwards when the vulcanization vessel 16 is opened. The action to open the vulcanization vessel 16 can accordingly be employed to remove the vulcanized tire TS from the bladder 22, while oily smoke generated when the tire has been removed from the bladder can still be efficiently discharged.

Since gas sucking out by the vacuum device 62 and the second vacuum device 76 is started when the vulcanization vessel 16 is opened under instruction from the controller 72, operation to initiate gas sucking out may be performed without operator intervention.

The vulcanization apparatus 10 is equipped with the smoke separator 64 for removing oily smoke for the gas sucked in with the suction line 14, and the air-curtain forming section 40 for forming the air-curtain FC by jetting gas discharged from the smoke separator 64. The air-curtain FC is formed from the top face peripheral edge portion 18E of the mounting section 18 to the bottom edge portion 20L of the hood section 20 even when the vulcanization vessel 16 is open, thereby partitioning the inside of the vulcanization vessel from the external space even when the vulcanization vessel 16 is open. The oily smoke is accordingly suppressed further by the air-curtain FC from spreading out into the surroundings when the vulcanization vessel 16 has been opened. An energy saving advantageous effect is also obtained due to the air-curtain FC being formed utilizing the discharge of the smoke separator 64. Even if, in place of the air-curtain FC, an air-curtain is formed by jetting further towards the outside than the outer perimeter of the side mold 30S the oily smoke can still be suppressed from spreading out into the surroundings when the vulcanization vessel 16 has been opened.

The gas discharged from the smoke separator 64 is also fed to the air-curtain forming section 40 via the heat recovery device 66. The energy efficiency is accordingly enhanced, and an energy saving advantageous effect and $CO_2$ emission reduction advantageous effect are further exhibited.

Figure 8:
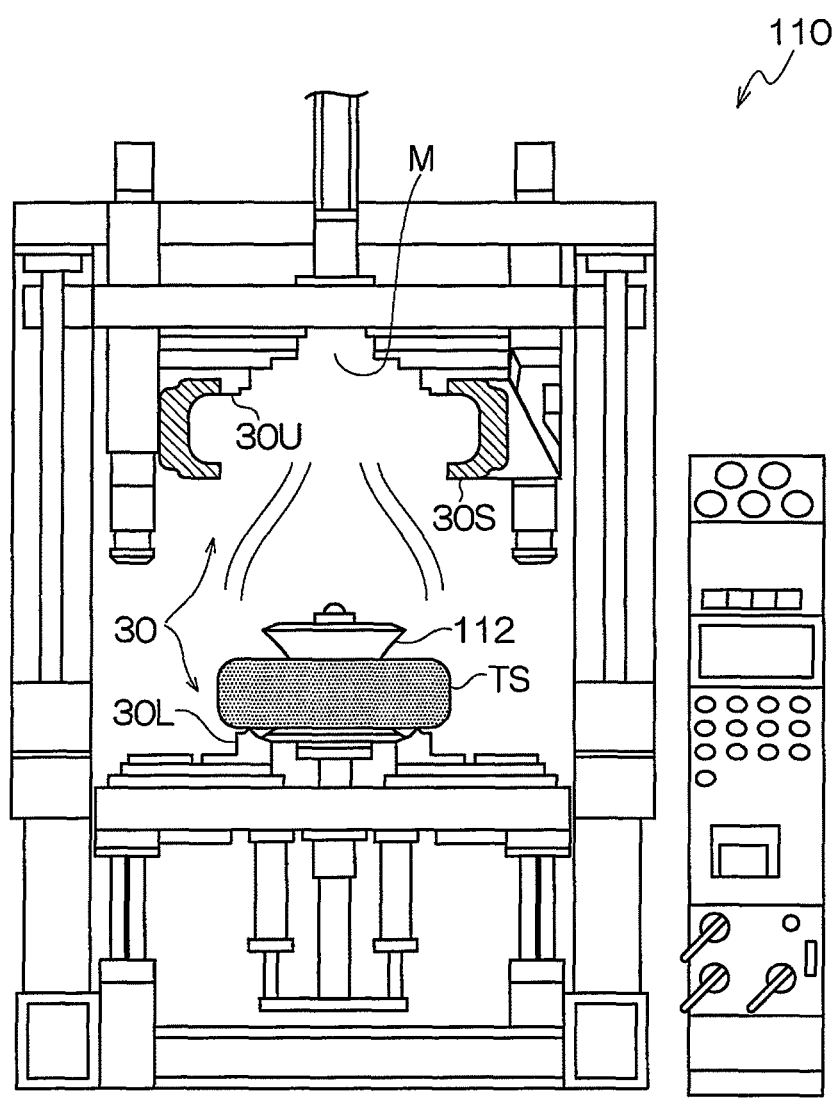
FIG. 8 is an explanatory diagram for explaining a configuration of a modified example of a vulcanization apparatus according to an exemplary embodiment of the present invention.

Note that in the present exemplary embodiment configuration is possible without provision of the hood section 20. In such cases configuration may be made such that an air-curtain is formed by jetting air towards a vulcanization vessel top side outside edge. In the present exemplary embodiment explanation has been given of a case in which the vulcanized tire TS is pulled off the bladder 22 by raising the side mold 30S with the vulcanized tire TS in a held state by the side mold 30S, when the vulcanization vessel 16 is being opened. However, as shown in FIG. 8, a vulcanization apparatus 110 may be configured such that a suction inlet M is formed at the top of a chamber, with the vulcanized tire TS that has remained on the lower mold 30L side after the mold 30 has been opened then pulled off a bladder 112, such as by using a known un-loader. In such cases, by continuing gas sucking with the suction line 14 until after the vulcanized tire TS has been removed from the bladder 112, oily smoke generated when the vulcanized tire TS has been removed from the mold 30 can be efficiently sucked in and discharged.

Namely, oily smoke generated when the vulcanized tire TS has been removed from the bladder 22 and the inner wall of the mold can be efficiently discharged wherever the vulcanized tire TS is placed in the vulcanization vessel 16 when the vulcanization vessel 16 is opened, enabling the oily smoke to be suppressed from spreading out into the surroundings. While explanation has been given of cases in which a green tire is vulcanized in the present exemplary embodiment, similar operation and effects are exhibited when non-vulcanized rubber is vulcanized in cases other than for a green tire.

Embodiments of the present invention has been explained above by means of the above exemplary embodiments, however the above exemplary embodiments are merely examples thereof and various modifications can be implemented within a scope not departing from the spirit of the present invention. Obviously the scope of patent rights of the present invention is not limited by the above exemplary embodiments.

The invention claimed is:

1. A vulcanization apparatus, comprising:
   a vulcanization vessel for vulcanizing a green tire supported by a bladder to obtain a vulcanized tire; and
   a suction device configured to suck out gas from a space surrounding an outer periphery of the bladder that is inside the vulcanization vessel after the vulcanization vessel has been opened and the vulcanized tire is separated from the bladder, wherein the suction device sucks out the gas from a central axis side of a vulcanized tire.

2. The vulcanization apparatus of claim 1, wherein the vulcanization vessel comprises a controller for controlling the suction device so as to start sucking out gas after the vulcanization vessel has been opened.

3. The vulcanization apparatus of claim 1, wherein:
   the vulcanization vessel comprises a hood section provided at least at an upper portion of the vulcanization vessel and covering from an outside at least a portion of the vulcanization vessel; and
   the suction device sucks out gas that is inside the hood section.

4. The vulcanization apparatus of claim 1, wherein:
   the vulcanization vessel comprises a mounting section; and
   an air-curtain forming section is provided to the mounting section to partition the inside of the vulcanization vessel from an external space using an air-curtain when the vulcanization vessel has been opened.

\* \* \* \* \*